Figures 1, 2, 3, 4:
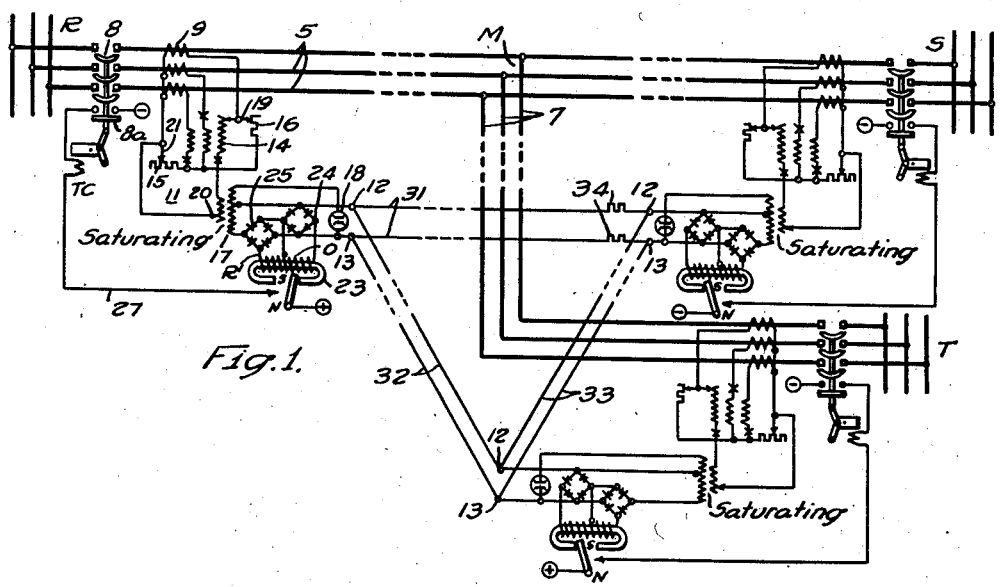

May 28, 1946.         J. P. KISCH         2,400,997
MULTITERMINAL PILOT-WIRE RELAYING
Filed March 8, 1944

30 miles between R and S
1500 ohms between R and S
45 total miles of pilot wires 60 miles between R and S
1500 ohms between R and S
180 total miles of pilot wires 60 miles between R and S
2000 ohms between R and S
180 total miles of pilot wires WITNESSES:
E. A. McCloskey
Nw. C. Groome INVENTOR
Joseph P. Kisch.
BY O. B. Buchanan
ATTORNEY Patented May 28, 1946

2,400,997

UNITED STATES PATENT OFFICE 2,400,997

MULTITERMINAL PILOT-WIRE RELAYING

Joseph P. Kisch, Maplewood, N. J., assignor to Westinghouse Electric Corporation, East Pittsburgh, Pa., a corporation of Pennsylvania Application March 8, 1944, Serial No. 525,517

8 Claims. (Cl. 175—294)

My invention relates to improvements in the pilot-wire connections of protective relaying systems for multi-terminal transmission lines, whereby the practical lengths of the pilot wires, and hence the lines, may be materially extended. By tranmission-lines, I refer to any transmission or distribution of electric power, and particularly three-phase power.

Heretofore, in applying pilot-wire relays for the protection of multi-terminal lines, the pilot-wires have been connected in star, as shown in Fig. 14 of the Harder Patent 2,183,646, granted December 19, 1939, and assigned to the Westinghouse Electric & Manufacturing Company, and in Fig. 8 of the Westinghouse Relay Catalog Section 41-658, dated June 29, 1942. Page 6 of the catalog section explains that, "On three terminal lines it is necessary that each leg of the pilot wire circuit have the same impedance (magnitude and angle). The addition of inexpensive balancing resistors at one or two terminals will usually satisfy this requirement." The idea was that, for through-current faults, or external faults, in a circulating-current pilot-wire system in which current is circulated through the pilot-wires during external faults, the star-point of the pilot-wire connections would have zero potential across the two pilot-wires, in the extreme case in which all of the fault current is limited to any two of the line-terminals entering the line at one terminal, and leaving the line at the other terminal, without any current in the third line-terminal.

In any practical pilot-wire system, it is necessary to provide some sort of network for deriving a single-phase relaying-current from the polyphase line-current transformers, in such a way that the single-phase relaying-current is representative of, or responsive to, various types and locations of faults. In practical systems, these current-modifying networks have had a limited-current characteristic, which limits the magnitude of the derived relaying-current, in the event of heavy line-faults. In the Type HCB relaying-system which is shown in the Harder patent, the pilot-wire relaying-system changes its characteristics according to the severity of the fault, so that, on extremely severe faults, the protective relaying system becomes essentially a phase-angle comparing-system, for comparing the phase-angles of the currents at the respective terminals of the protected line, whereas, for very light faults, the protective system partakes more of the nature of obtaining the vectorial sum of the fault-currents which flow in the several line-terminals, as in a ratio-differential protective system. As a result of the variability in the relay-characteristics, depending upon the degree of saturation or current-limiting effect in the networks which produce the single-phase relaying-currents, it is particularly difficult, and well-nigh impossible, to accurately predict the performance of the relay, under different conditions, without special tests for those particular conditions.

A further practical limitation in the use of pilot-wires is that most pilot-wires are rented from the telephone company, and hence they are fixed in regard to the standard size of wires which the telephone company utilizes. As pointed out in the Harder patent, the operation of the pilot-wire relaying-system is perfect only if the pilot-wire impedance is negligible as compared to an impedance of the pilot-wire relays, and hence, as the pilot-wires become longer and longer, the margin of safe or correct operating conditions of the pilot-wire relaying-system becomes smaller and smaller, until finally the pilot-relays will not respond correctly, under any conditions of operation. The Westinghouse Catalog Section recommends that, "The pilot wire resistance on three terminal lines should not exceed 500 ohms per leg or 1000 ohms between the terminals. This value should include any neutralizing transformers or other equipment in the pilot circuit." With special pilot-relay design and adjustment, in systems where too great a margin of safe operation is not required, correct operation of the relays can be reasonably expected when the pilot-wire impedance is as great as 750 ohms, or even 800 ohms, in each leg of a three-terminal star-connected pilot-wire system.

As the impedance of rented pilot-wires, supplied by the telephone company, is fairly high per mile, the practical length of pilot-wire relaying is quite limited. Of course, these limits could be extended by renting two or three pairs of pilot-wires, for each pilot-wire leg, and connecting the several pairs in parallel, but such procedure offers such great practical difficulty in maintaining the correct polarities of the large number of rented pilot-wires, notwithstanding inevitable occasional polarity-reversals which are made by the operating personnel who service the telephone circuits—that practically no transmission-line operator has yet cared to undertake the responsibility of such complication.

In this state of the art, my present invention escapes from the idea of providing a centrally located star-connection point at which the pilot-wire voltage-drops are neutralized, for external-fault conditions, and I utilize a delta connection of the pilot-wires, and by this simple expedient, I am enabled to double the length of the protected transmission-line, and still obtain a suitable degree of reliability of pilot-relay operation.

With the foregoing and other objects in view, my invention consists in the circuits, systems, apparatus, combinations, and methods hereinafter described and claimed, and illustrated in the accompanying drawing, wherein:

Figure 1 is a diagrammatic view of circuits and apparatus embodying my invention; and Figs. 2, 3, and 4 are schematic diagrams which will be referred to in the discussion of the comparative operation of the invention.

In Fig. 1, I have illustrated my invention as being applied to a three-terminal, three-phase transmission system, the three line-terminals being represented by station-buses R, S, and T. Each of the buses R, S, and T is intended to represent, in the general case, a synchronous transmission or distribution system including both generating equipment and load circuits. Between the stations R and S, there extends a three-phase transmission-line 5, an intermediate point M of which is tapped and connected to a three-phase branch-line 7 which extends to the terminal-bus T.

At each of the line-terminals, the transmission-line is provided with certain equipment, only one of which will be described in detail, as the three terminal-equipments are, or may be, identical. The transmission-line is connected to its terminal-bus through a three-phase circuit breaker 8 which is provided with a trip-coil TC and an auxiliary make-contact breaker-switch 8a. Each of the line-terminal equipments also includes a bank of line-current transformers 9 which are connected to a suitable network 11 for providing a single-phase relaying-voltage which is obtained at the network-terminals 12 and 13.

The particular type of network 11 which is illustrated in the drawing, is the type HCB network of the Harder patent, which combines the positive-sequence line-current component with the zero-sequence line-current component in such manner as to provide an alternating-current relaying-voltage having a limited-magnitude characteristic. As explained more fully in the Harder patent, the illustrated network includes a three-coil mutual inductance 14, resistors 15 and 16, a saturating output-transformer 17, and a voltage-limiting glow-tube 18. The network is also provided with three sets of adjustments, as shown at 19, 20, and 21, by which adjustment may be made, respectively, to compensate for current-transformers of different ratios at the various line-terminals, to compensate for magnitudes of line-to-line fault-currents on different transmission systems, and to adjust the relays as to their relative sensitivity to ground-faults.

Each of the terminal-equipments also includes a differential pilot-wire relay 23, which is preferably a polarized relay, which is more sensitive than most alternating-current relays. The relay is provided with an operating coil O and a restraining coil R', the operating coil having more turns than the restraining coil. The operating coil is energized from the direct-current terminals of a rectifier-bridge 24, which is connected in shunt across the network-terminals 12 and 13. The restraining winding R' is energized from the direct-current terminals of a rectifier-bridge 25, which is connected in series-circuit relation between the saturating output-transformer 17 of the network and the network-terminals 12 and 13.

The differential relay 23 is utilized to energize a trip-circuit 27 for controlling the circuit-breaker 8.

According to my present invention, I provide a special connection for the pilot-wires which are connected between the three pairs of network-terminals 12 and 13 at the three line-terminals R, S, and T. According to my invention, I utilize a delta-connection of pilot-wires, each pilot-wire consisting of a pair of wires. Three pilot-wires are utilized, for a three-terminal line, and more for a line having more than three terminals. A first pilot-wire 31 extends between the terminals 12—13 at the stations R and S, a second pilot-wire 32 extends between the terminals 12—13 at stations R and T, and a third pilot-wire 33 extends between the terminals 12—13 at stations S and T.

In operation, the terminal equipments at each of the line-terminals R, S, and T are all alike, each responding to currents looking into the protected transmission line, that is, each responding, in the same manner, when the line-current is flowing into the protected transmission-line at its own terminal. The delta-connected system of pilot-wires 31, 32, and 33 serves as means for connecting the several derived relaying-voltages in parallel-circuit relation to each other, or for totalizing the network terminal voltages at the three different terminals. Each of the pairs of pilot-wires serves as a pilot-channel means which is selectively operated between two different line-terminals for producing, at each of said terminals, a relaying voltage of limited magnitude, in response to the phase-angle of the limited-magnitude quantity at the other terminal of the pilot-wire.

Experience has proved that my improved delta-arrangement of pilot-wire connections makes it possible to obtain the same expectancy of correct relay-operation with pilot-wire impedances up to 3000 ohms between stations, as was formerly obtained with star-connected pilot-wires having an impedance of 750 or 800 ohms in each leg, or 1500 to 1600 ohms between each pair of stations.

If the distances between the several pairs of stations are not all identical, so that the pilot-wire impedances are not exactly matched, I can add resistances or impedances 34 to the pairs of pilot-wires in which the impedance would otherwise be lower than the impedance of the other two pairs of wires, as indicated in the case of the pilot-wires 31.

The comparative operation of my improved pilot-wire connection will perhaps be better understood by reference to Figs. 2, 3, and 4. In Fig. 2, I have schematically represented, in single-line diagram, the limiting pilot-wire impedances of the previously practiced star-connection of pilot-wires. Each pilot-wire leg has a total double-wire impedance of 750 ohms, corresponding to 1500 ohms between the terminals R and S. Figuring roughly 50 ohms per mile for the purpose of illustration, this corresponds to 30 miles between the terminals R and S. The total mileage of double-wire pilot-wires is 45 miles.

Fig. 3 shows the kind of complication which would be involved in an attempt to double the distance between stations R and S by connecting two pairs of pilot-wires in parallel with each other, for each leg of the pilot-wire star-connection. It will thus be seen, that instead of having only three pilot-wires to supervise as to the maintenance of correct relative polarities, there are now six of them, each pilot-wire having a limiting impedance of 1500 ohms, or a length of 30 miles. The system shown in Fig. 3 extends the limiting-distance between the stations R and S to 60 miles, and it utilizes a total of 180 miles of double-wire pilot-wires.

As compared with the complexity of Fig. 3, and the limited distances or impedances of Fig. 2, the advantage of my delta-connection, of Fig. 4, is readily noticeable. Each leg of the delta may have an impedance as high as 3000 ohms, corresponding to 60 miles between any pair of line-terminals R, S, and T. Between any two line-terminals, such as R and S, there are two pilot-wire paths or circuits, one having an impedance of 3000 ohms, and the other having an impedance of 6000 ohms, making a total pilot-wire impedance of 2000 ohms between terminals R and S, or any other two pairs of terminals. My delta connection utilizes a total of 180 miles of double-wire pilot-wires, but it does it with only three separate pilot-wires, which is thus no more complicated to supervise than the previously standard star-connection which is indicated in Fig. 2.

I claim as my invention:

1. A pilot-wire relaying system for a multi-terminal transmission line having more than two line-terminals, comprising line-current-responsive means at each line-terminal for deriving an alternating-current relaying quantity at that terminal, a plurality of separate delta-connected pairs of pilot-wires, each pair of pilot-wires extending between two different line-terminals, circuit-connections for utilizing said plurality of pairs of pilot-wires for totalizing all of said relaying quantities at each line-terminal, and relaying means at each line-terminal for responding in a predetermined manner to the totalized quantity at that station.

2. A pilot-channel phase-angle relaying system for a multi-terminal transmission line having more than two line-terminals, comprising means at each terminal for deriving a relaying quantity of limited magnitude for responding to the phase-angle of the line-current input into the transmission line at that terminal, a plurality of different delta-connected pilot-channel means, each pilot-channel means being selectively operative between two different line-terminals for reproducing, at each of said terminals, a relaying quantity of limited magnitude in response to the phase-angle of the limited-magnitude quantity at the other terminal, and relaying means at each line-terminal for responding in a predetermined manner to the limited-magnitude quantities at that terminal.

3. A pilot-wire relaying system for a multi-terminal transmission line having more than two line-terminals, comprising means at each terminal for providing an alternating-current derived-voltage source which is responsive to the line-current input into the transmission line at that terminal, delta-connected pilot-wire means for connecting all of said derived-voltage sources in parallel to each other, and relaying means at each line-terminal for developing an operative force responsive to the voltage of the parallel-connected derived-voltage sources and for developing a restraining force responsive to the current fed into said parallel-connected derived-voltage sources by the local derived-voltage source at that line-terminal, characterized by said pilot-wire means comprising a plurality of separate pairs of pilot wires, each pair of pilot wires extending between the derived-voltage sources at two different line-terminals.

4. A pilot-channel phase-angle relaying system for a multi-terminal transmission line having more than two line-terminals, comprising means at each terminal for providing a source of a relaying quantity which is responsive to the phase-angle of the line-current input into the transmission line at that terminal, totalizing means for totalizing all of said sources of relaying quantities at all of the line-terminals, and relaying means at each line-terminal for developing an operative force responsive to the totalized relaying quantity and for developing a restraining force responsive to the local source of relaying quantity at that line-terminal, characterized by said totalizing means comprising a plurality of different delta-connected pilot-channel means, each pilot-channel means being selectively operative between two different line-terminals for reproducing, at each of said terminals, a relaying quantity of limited magnitude in response to the phase-angle of the limited-magnitude quantity at the other terminal.

5. A pilot-wire relaying system for a three-terminal transmission line, comprising line-current-responsive means at each line-terminal for deriving an alternating-current relaying quantity at that terminal, three separate pairs of pilot-wires, each pair of pilot-wires extending between two different line-terminals, circuit-connections for utilizing said three pairs of pilot-wires for totalizing all of said relaying quantities at each line-terminal, and relaying means at each line-terminal for responding in a predetermined manner to the totalized quantity at that station.

6. A pilot-channel phase-angle relaying system for a three-terminal transmission line, comprising means at each terminal for deriving a relaying quantity of limited magnitude for responding to the phase-angle of the line-current input into the transmission line at that terminal, three different pilot-channel means, each pilot-channel means being selectively operative between two different line-terminals for reproducing, at each of said terminals, a relaying quantity of limited magnitude in response to the phase-angle of the limited magnitude quantity at the other terminal, and relaying means at each line-terminal for responding in a predetermined manner to the limited-magnitude quantities at that terminal.

7. A pilot-wire relaying system for a three-terminal transmission line, comprising means at each terminal for providing an alternating-current derived-voltage source which is responsive to the line-current input into the transmission line at that terminal, pilot-wire means for connecting all of said derived-voltage sources in parallel to each other, and relaying means at each line-terminal for developing an operative force responsive to the voltage of the parallel-connected derived-voltage sources and for developing a restraining force responsive to the current fed into said parallel-connected derived-voltage sources by the local derived-voltage source at that line-terminal, characterized by said pilot-wire means comprising three separate delta-connected pairs of pilot-wires, each pair of pilot-wires extending between the derived-voltage sources at two different line-terminals.

8. A pilot-channel phase-angle relaying system for a three-terminal transmission line, comprising means at each terminal for providing a source of a relaying quantity which is responsive to the phase-angle of the line-current input into the transmission line at that terminal, totalizing means for totalizing all of said sources of relaying quantities at all of the line-terminals, and relaying means at each line-terminal for developing an operative force responsive to the totalized relaying quantity and for developing a restraining force responsive to the local source of relaying quantity at that line-terminal, characterized by said totalizing means comprising three different pilot-channel means, each pilot-channel means being selectively operative between two different line-terminals for reproducing, at each of said terminals, a relaying quantity of limited magnitude in response to the phase-angle of the limited-magnitude quantity at the other terminal.

JOSEPH P. KISCH.